(12) United States Patent
Ankner

(10) Patent No.: US 9,622,426 B2
(45) Date of Patent: Apr. 18, 2017

(54) **METHOD OF IMPROVING THE GROWTH AND PRODUCTION OUTPUT OF PLANTS OF THE FAMILY *CANNABACEAE SENSU STRICTO***

(71) Applicant: Charles E. Ankner, Santa Maria, CA (US)

(72) Inventor: Charles E. Ankner, Santa Maria, CA (US)

( * ) Notice: Subject to any disclaimer, the term of this patent is extended or adjusted under 35 U.S.C. 154(b) by 322 days.

(21) Appl. No.: 14/046,050

(22) Filed: Oct. 4, 2013

(65) Prior Publication Data

US 2015/0096230 A1    Apr. 9, 2015

(51) Int. Cl.
*A01G 31/02* (2006.01)
*A01G 7/00* (2006.01)
*A01G 1/00* (2006.01)

(52) U.S. Cl.
CPC ............. *A01G 31/02* (2013.01); *A01G 1/001* (2013.01); *Y02P 60/216* (2015.11)

(58) Field of Classification Search
USPC ...... 47/59 R, 62 R–62 N, 63, 60, 58.1 R, 17, 47/79, 2, 88
See application file for complete search history.

(56) References Cited

U.S. PATENT DOCUMENTS

| | | |
|---|---|---|
| 891,176 A | 6/1908 | Von Der Kammer |
| 987,805 A | 3/1911 | Von Der Kammer |
| 2,051,460 A | 8/1936 | Von Skrbensky |
| 2,051,461 A | 8/1936 | Lee |
| 2,897,631 A | 4/1959 | Howsley, Jr. et al. |
| 2,928,211 A | 3/1960 | Martin |

(Continued)

FOREIGN PATENT DOCUMENTS

| | | |
|---|---|---|
| CN | 1253715 B1 | 11/1998 |
| CN | 101653089 B1 | 9/2009 |

(Continued)

OTHER PUBLICATIONS

The Effect of Root and Shoot Temperatures on Growth of Ceanothus greggii Seedlings, A. Larigauderie et al, Animals of Botany; 67, 97-101, 1991 retrieved on Nov. 3, 2015 [retrieved from http://aob.oxfordjournals.org/].*

(Continued)

*Primary Examiner* — Andrea Valenti
(74) *Attorney, Agent, or Firm* — The Roy Gross Law Firm, LLC; Roy Gross

(57) ABSTRACT

A method of improving the growth of plants belonging to the family Cannabaceae sensu stricto by providing a plant nutrient solution about the plant roots and a gas mixture circulating about the plant shoot; by selecting the gas mixture and plant nutrient solution temperature independently of the other; and providing a plant nutrient solution to gas mixture temperature differential of approximately 0° F. or of at least approximately 15° F. during different phases of plant development, in order to change the plant development to improve a desired plant organ for industrial, scientific, and medical purposes. Infection of plants by *Pythium, Fusarium, Verticillium*, and *Rizoctonia* are treated or prevented by selecting a gas mixture temperature that is approximately 65 to 85° F. and a plant nutrient solution temperature that is approximately 35 to 65° F.

17 Claims, 10 Drawing Sheets

(56) References Cited

U.S. PATENT DOCUMENTS

| | | | |
|---|---|---|---|
| 2,952,096 A | 9/1960 | Hughes et al. | |
| 3,327,425 A | 6/1967 | Dosedla et al. | |
| 3,432,965 A | 3/1969 | Smith et al. | |
| 3,458,951 A | 8/1969 | Martin | |
| 3,931,695 A | 1/1976 | Widmayer | |
| 4,079,547 A | 3/1978 | Walker | |
| 4,332,105 A | 6/1982 | Nir | |
| 4,345,405 A | 8/1982 | Davis | |
| 4,411,101 A | 10/1983 | Springer et al. | |
| 4,486,977 A * | 12/1984 | Edgecombe et al. | 47/59 R |
| 4,577,435 A | 3/1986 | Springer et al. | |
| 4,612,725 A | 9/1986 | Driver | |
| 4,662,105 A | 5/1987 | LaGow | |
| 4,669,217 A * | 6/1987 | Fraze | 47/64 |
| 4,817,332 A * | 4/1989 | Ikeda et al. | 47/17 |
| 4,850,134 A | 7/1989 | Snekkenes | |
| 4,983,307 A | 1/1991 | Nesathurai | |
| 5,001,859 A | 3/1991 | Sprung | |
| 5,209,012 A | 5/1993 | Palmer | |
| 5,501,037 A | 3/1996 | Aldokimov | |
| 5,597,731 A | 1/1997 | Young et al. | |
| 5,642,587 A | 7/1997 | Janes et al. | |
| 5,771,634 A | 6/1998 | Fudger | |
| 5,813,168 A | 9/1998 | Clendening | |
| 5,922,316 A | 7/1999 | Smith et al. | |
| 5,992,090 A * | 11/1999 | Stutte et al. | 47/58.1 R |
| 6,105,309 A | 8/2000 | Takayanagi | |
| 6,148,559 A | 11/2000 | May | |
| 6,216,390 B1 | 4/2001 | Peregrin Gonzalez | |
| 6,389,751 B1 | 5/2002 | Wang | |
| 6,581,327 B2 | 6/2003 | Adelberg et al. | |
| 7,069,689 B2 | 7/2006 | Craven et al. | |
| 7,617,057 B2 | 11/2009 | May et al. | |
| 7,987,632 B2 | 8/2011 | May et al. | |
| 8,009,048 B2 | 8/2011 | Hyde et al. | |
| 8,291,639 B2 | 10/2012 | Gardner et al. | |
| 8,305,214 B2 | 11/2012 | Hyde et al. | |
| 8,443,546 B1 | 5/2013 | Darin | |
| 8,881,454 B2 | 11/2014 | Janney | |
| 2004/0244283 A1* | 12/2004 | Chen | 47/17 |
| 2007/0289207 A1* | 12/2007 | May et al. | 47/17 |
| 2009/0223128 A1 | 9/2009 | Kuschak | |
| 2011/0252705 A1 | 10/2011 | Van Gemert et al. | |
| 2012/0210640 A1 | 8/2012 | Ivanovic | |
| 2014/0033609 A1 | 2/2014 | Tyler et al. | |
| 2014/0290131 A1 | 10/2014 | Inskeep | |
| 2014/0325908 A1 | 11/2014 | Faris | |

FOREIGN PATENT DOCUMENTS

| | | |
|---|---|---|
| NL | 1020694 C1 | 5/2002 |
| TW | 20080106998 A1 | 9/2009 |

OTHER PUBLICATIONS

Growth Responses of Hemp to Differential Soil and Air Temperatures; Nelson, Clarence H., plant Physiol. Apr. 1944; 19(2):294-309. Missouri Valley College, Marshall, Missouri, US [retrieved from http:www.ncbi.nlm.nih.gov/pmc/articles/PMC438156/?page=1] retrieved on Nov. 3, 2015.*

Grasscity forums, The ideal conditions to grow marijuana, Andronius, 10 pages Aug. 16, 2009 [retrieved from internet Mar. 10, 2016] https://forum.grasscity.com/threads/the-ideal-conditions-to-grow-marijuana-list.446508/.*

Nelson, Clarence H., Growth Responses of Hemp to Differential Soil and Air Temperatures, Plant Physiol. Apr. 1944; 19(2): 294-309. Missouri Valley College, Marshall, Missouri, US. (available at http://www.ncbi.nlm.nih.gov/pmc/articles/PMC438156/?page=1).

Weaver, John E. and Bruner, William E., Root Development of Vegetable Crops, McGraw-Hill Book Company, Inc., 1927, New York, NY. McGraw-Hill Book Company, Inc. New York, NY US (available at http://www.sustainablefarmer.com/pdflibrary/library-rootdevelopment.pdf).

Jenson, Merle H., Controlled Environmental Agriculture in Deserts, Tropics and Temperate Regions—A World Review, University of Arizona, College of Agriculture and Life Sciences, 2010, Tucson, AZ 85721 US (Paper # I-125933-03-00) (available at http://ag.arizona.edu/ceac/sites/ag.arizona.edu.ceac/files/jensen%20Taiwan%20World%20Review%20of%20CEA.pdf).

Trejo-Tellez, Libia I. and Gomez-Merino, Fernando C., Nutrient Solutions for Hydroponic Systems, Colegio de Postgraduados, Montecillo, Texcoco, State of Mexico, MX. (available at http://www.scribd.com/doc/146659132/145078534-InTech-Nutrient-solutions-for-hydroponic-systems-1-pdf-1-pdf#scribd).

Diaz-Perez, Juan C., Root Zone Temperature, Plant Growth, and Fruit Yield of Tomatillo as Affected by Plastic Film Mulch, HortScience 40(5):1312-1319., 2005. Department of Horticulture, Coastal Plain Experiment Station—Tifton Campus, University of Georgia, Tifton, GA 31793-0748 US. (available at http://hortsci.ashspublications.org/content/40/5/1312.full.pdf).

Reddell, Paul., Bowen, G.D., and Robson, A.D., The Effects of Soil Temperatures on Plant Growth, Nodulation and Nitrogen Fixation in Casurina Cunninghamiana MIQ., New Phytol. 101, 441-450, doi: 10.1111/j.1469-8137.1985.tb02850.x. 1985 US. (available at http://onlinelibrary.wiley.com/doi/10.1111/j.1469-8137.1985.tb02850.x/abstract).

McMichael, B.L., and Quisenberry, J.E, The Impact of Soil Environment on the Growth of Root Systems, Environmental and Experimental Botany; USDA-ARS Cropping Sys Research Lab, Plant Stress and Water Conserv. Research Unit, Rte 3, Box 215, Lubbock, TX 79401 US; Environmental and Experimental Botanay, vol. 33, No. 1, pp. 53-61, 1993. GB. (available at http://naldc.nal.usda.gov/download/34787/PDF).

* cited by examiner

FIG. 4

METHOD OF IMPROVING THE GROWTH AND PRODUCTION OUTPUT OF PLANTS OF THE FAMILY *CANNABACEAE SENSU STRICTO*

FIELD OF THE INVENTION

The present inventive method relates to improving the growth and development of Cannabaceae sensu stricto plants. More specifically, the invention relates to a method of utilizing shoot to root temperature differentials to improve Cannabaceae sensu stricto plant growth and development for industrial, scientific, and medical uses. The invention further relates to a method of improving the growth and development of Cannabaceae sensu stricto plants by lowering the plant root system temperature to treat or prevent infection by a plant pathogen

BACKGROUND OF THE INVENTION

"In the beginning God made heaven and earth . . . . Then God said, 'Behold, I have given you every seed-bearing herb that sows seed on the face of all the earth, and every tree whose fruit yields seed; to you it shall be for food. I also give every green plant as food for all the wild animals of the earth, for all the birds of heaven, and for everything that creeps on the earth in which is the breath of life.' It was so. Then God saw everything He had made, and indeed, it was very good. So evening and morning were the sixth day." Book of Genesis, Chap 1:1, 29-31, commonly attributed to "the Yahwist", circa $5^{th}$ Century B.C.E, as translated and interpreted in The Orthodox Study Bible: Ancient Christianity Speaks to Today's World, Thomas Nelson Publishing, 2008, USA.

" . . . the greatest service which can be rendered to any country is to add a useful plant to its culture; especially a bread grain, next in value to bread, is oil.", Thomas Jefferson, $3^{rd}$ President of the United States of America, Memorandum of Services to My Country, 1800, Charlottesville, Va. USA.

"Damn it Charles, no damn good will ever come of this *cannabis* crap! Plus, it's illegal!" Excited utterance of Frank G. Ankner, father of instant inventor, 1978, Lake Worth, Fla. USA.

It is known in the field of plant husbandry, and in many related fields of endeavor, that a shoot to root temperature differential causes physiological ontogenic changes in plants (i.e. a shoot to root temperature differential during plant development causes physical changes in plant characteristics). Depending upon the plant species or variety, purposeful and selected changes in plant characteristics during development caused by providing shoot to root temperature differentials may be exploited for industrial, scientific, and medical uses.

Referring to FIG. 1, which depicts a phylogenetic diagram (100) of the Cannabaceae sensu lato (110) plant family, Cannabaceae sensu lato (s.l.) is a small family of flowering plants of about one-hundred-and-seventy species grouped in about eleven genera, including by their common names: hemp, hops, and hackberries.

*C. celtis* L. (the "hackberries") is the largest genus, containing about one-hundred species. Hackberries have also been scientifically classified as the plant family Celtidaceae (130).

The genus *C. humulus* L. ("hops") and *C. cannabis* L. ("hemp") each contain only three species. The *C. humulus* L. and *C. cannabis* L. genus plants have also been scientifically classified as the plant family Cannabaceae sensu stricto (120).

All Celtidaceae varieties are dioecious perennials (i.e. male and female flowering plants living longer than two growing seasons).

The Cannabaceae sensu stricto ("s.s.") family are all dioecious having either twining or erect stems. *C. humulus* L. genera plants have "bines" and are perennials, while *C. cannabis* L. genera plants have erect stems and are annuals (i.e. living only one growing season).

Since antiquity, the Cannabaceae s.s. family of plants have had a wide variety of innovative uses, with some varieties being used for and as food, spice, and for ceremonial purposes as early as 8000 B.C. Modern uses of the Cannabaceae s.s. family include; varieties being cultivated for plant fiber used in almost innumerable products, varieties being cultivated containing flavonoid and aromatic substances used in the production of beer and in fragrances, varieties being cultivated for human and animal consumption, varieties being cultivated for oil as illumination and lubrication, and being cultivated for oil as bio-fuel replacements for fossil-fuel, and varieties cultivated which contain powerful antimicrobial substances used as sanitizers, antibiotics, and being researched as anti-cancer agents.

The flowers of *C. humulus* L. varieties are boiled with wort, and at times added post-ferment to beer during brewing.

Flowers of *C. humulus* L. varieties are also used to prepare medicinal "bitter acids" (prenylated acylphloroglucinol derivatives); traditionally used for ailments such as, anxiety disorders, sleep disorders, attention-deficit, hyperactivity disorder (ADHD), and for intestinal disorders including mucous colitis. "Bitter acids" are also used to improve appetite, increase urine flow, aid lactation, aid digestion, reduce high cholesterol, treat tuberculosis, treat upper and lower urinary tract infections, relieve intestinal cramps, relieve neuropathy pain and numbness, treat priapism, as topical skin creams, and as antibiotics.

Other modern uses of *C. humulus* L. varieties include, compounds with antimicrobial effects against certain pathogens like bacteria (*staphylococcus aureus* and *bacillus subtilis*), and against certain fungi (*trichophylon interdigitale*)—which causes ringworm in animals and humans.

Flowers of *C. humulus* L. varieties also contain xanthohumol, (prenylated chalconoid) a compound showing promise in and as anti-platelet activating, so-called "clot-busting", drugs, used widely in primary and secondary treatment and prevention of thrombotic cerebrovascular or cardiovascular disease.

*C. humulus* L. flowers also produce other compounds (terpenophenolic metabolites) which may possess estrogenic and endocrine disrupting properties.

Research continues into *C. humulus* L. variety substances used in and as anti-cancer agents and drugs.

Many cultural anthropologists and ethnobotanists hold that *C. cannabis* L. varieties are among the first plants cultivated by humanity. Modernly, *C. cannabis* L. varieties are cultivated and utilized extensively and world-wide. Stems, branches, and leaves are used for plant fiber and as biofuel; sprouts and seeds as food-stocks; seeds for inexpensive lubrication and illumination oil, and also as biofuel; flowers for aromatic, recreational, ritual, sacramental, and medicinal purposes; and roots for medicinal and pharmaceutical formulations.

Substances contained in *C. cannabis* L. varieties are also used to manufacture pharmaceuticals such as Sativex® and Nabiximols (USAN); non-narcotic formulations to treat moderate-to-severe neuropathic pain and numbness.

Recently, substances in some *C. cannabis* L. varieties have been used to effectively eradicate both MRSA and ORSA bacterium (Methicillin-Resistant *Staphylococcus aureus* and Oxacillin-Resistant *Staphylococcus aureus*), occurring both in and ex vivo.

MRSA and ORSA are both extremely virulent, antibiotic resistant strains of bacterium which sicken millions and cause hundreds of thousands of deaths per-year world-wide; particularly in industrialized nations. Research continues into using *C. cannabis* L. variety substances as and in sanitizers and antibiotics which kill pathogens like MRSA and ORSA, and other drug resistant pathogens.

Due to former restrictive federal and state legislation, the varied and innovative industrial, scientific and medical uses of *C. cannabis* L. varieties substances are now only recently, and yet increasingly, being realized.

Cannabaceae s.l. plants, particularly the Celtidaceae family, with all genera being perennials, have hardy and robust root systems tolerant of temperatures well below freezing, some varieties withstanding temperatures of approximately 0° F. or below for long periods of time.

Referring again to FIG. 1, the genus *Cannabis* was formerly placed in the Nettle or *Urticaceae* (140) genus; or the Mulberry or *Moraceae* (150) genus. Later, along with the *Humulus* genus, *Cannabis* was placed in a separate family—Cannabaceae s.s. (120), as illustrated in FIG. 1.

Recent phylogenetic studies strongly suggest that the Cannabaceae s.s. family arose from within the former Celtidaceae family, and that the two families should be merged to form a single monophyletic family, the family Cannabaceae s.l. In layperson's terms, *C. humulus* L. and *C. cannabis* L. genera varieties are genetically like "little trees".

Being genetically related to, and arising from, the former Celtidaceae family, some varieties of family Cannabaceae s.s. share the trait of root systems which can tolerate temperatures well below 32° F. for long periods of time.

*C. humulus* L. varieties are perennials as are former Celtidaceae family plants (trees). Being perennials, the plant shoot dies back to the root crown every growing season; that is, the plant goes dormant each growing season and "re-sprouts" at the start of the next growing season.

In a related way, *C. cannabis* L. varieties share some common traits with Celtidaceae trees, although all *C. cannabis* L. varieties are annuals. One trait some *C. cannabis* L. varieties share with Celtidaceae trees and some *C. humulus* L. varieties, is a root system tolerant of temperatures approaching or below 32° F. for long periods of time.

However, most Cannabaceae s.s. varieties possessing this "low temperature root tolerance" are typically and errantly thought to be intolerant overall of temperatures below approximately 50 to 60° F.

In fact, some *C. cannabis* L. varieties can tolerate low root system temperatures throughout development. Additionally, some *C. cannabis* L. varieties can tolerate increasingly lower root system temperatures when the plant shoot is maintained at known "optimal" temperatures for a particular varietal strain.

This Cannabaceae s.s. low temperature root tolerance trait coupled with known physiological ontogenic changes caused by shoot to root temperature differentials during plant growth, may be exploited to modify the plant's physiological ontogeny, and thus improve desired plant organ development for industrial, scientific, and medical purposes.

In known horticultural and agricultural systems, the temperature of the growing medium, such as soil, soil replacements, liquids, air-misting, aquaponic reservoirs, and the like, maintain the plant root system temperature within a few degrees of the air/gas mixture about the plant shoot. In other words, in known systems, "the roots are as hot as the shoot".

However, by maintaining a plant shoot to root temperature differential by lowering the root temperature, the dissolved oxygen saturation level of the nutrient solution within the growth medium may be increased which in turn increases the oxygen and nutrient uptake of the plant. In basic terms; the lower the growth medium nutrient solution temperature, the more oxygen may be dissolved within the solution. This increased dissolved oxygen increases the permeability of the plant roots to water and minerals, which increases plant nutrient uptake, thus increasing the growth rate and overall health of the plant.

As may be deduced, there is interplay between plant solution oxygen solubility and plant nutrient uptake. As oxygen solubility increases, so does plant nutrient uptake. Ordinarily, this increase would be viewed as advantageous. However, in most hydroponic or aquaponic growing systems, as well as in irrigated outdoor farming, nutrient solutions and/or fertilizers have preferred and specific nitrogen-phosphorous-potassium (hereinafter "N-P-K") concentrations tailored to specific varieties of plants, and further tailored to the growth phases of those plant varieties and varietal strains. Many of these N-P-K formulations are high in concentration and intended to maximize crop yield; and yet be at levels just below a point which begins to damage or "chemically burn" the plant. As selected plant nutrient solution temperatures are lowered, the increased nutrient uptake of the plant requires differing solution N-P-K concentration levels and ratios to improve overall plant development without damaging or "chemically burning" the plant.

As is also well known in agriculture and horticulture, in many plant varieties, high nutrient solution temperatures can cause root system oxygen starvation. As the temperature increases, nutrient solution oxygen solubility dramatically decreases and the plant essentially suffocates. Plant injury from hypoxia (low, or no, oxygen) at the roots may take several forms, each differing in severity and depending upon the plant family and variety.

Typically, the first sign of root suffocation is wilting of the plant shoot during the warmest part of the day when temperatures and light levels are highest, or the overall wilting of plants grown with artificial illumination in controlled conditions. Insufficient oxygen reduces the permeability of roots to water and results in the accumulation of toxins, thus both water and minerals cannot be absorbed in sufficient quantities to support plant growth, particularly under plant stress conditions.

This wilting is accompanied by slower rates of photosynthesis and carbohydrate transfer, and over time plant growth is reduced and crop yields are negatively affected. If oxygen starvation continues, mineral deficiencies in the plant will set-in, roots will die back, and plants will become stunted. Under these continuing anaerobic conditions, plants produce a stress hormone—ethylene—which accumulates in the roots and causes the collapse of root cells. Once root injury and deterioration caused by anaerobic conditions has begun, common opportunist pathogens such as *Pythium Fusarium, Verticillium*, and *Rizoctonia*, and the like, can easily infect and rapidly destroy the plant.

In such tragic cases, even highly trained and experienced horticulturalist mistakenly treat this "root rot" by attempting to prevent or destroy the pathogens by using various techniques and/or chemicals, rather than by lowering the temperature of the nutrient solution during growth and thus promoting a strong and vigorous root system which naturally protects against such common pathogens.

Known and undesirable methods attempting to prevent and/or treat this "root rot" include; filtering the nutrient solution by reverse-osmosis, "sterilizing" the nutrient solution with hydrogen-peroxide, ozone, or other chemicals, irradiating the nutrient solution with high intensity ultraviolet light, or by other means; and also by introducing a so called "beneficial pathogen" to prevent or destroy an "unwanted pathogen".

U.S. Patent Application No. 2012/0210640 by Ivanovic discloses a hydroponic growth system wherein nutrient solution temperature is an environmental parameter monitored and controlled by automatic means.

U.S. Patent Application No. 2009/0223128 by Kuschak discloses a hydroponic growth system wherein nutrient solution temperature is an environmental parameter monitored and controlled by automatic and remote means.

U.S. Pat. No. 8,443,546 to Darin discloses a hydroponic growth system wherein a small self-contained water chiller is optionally provided for reducing high nutrient solution reservoir temperatures caused by close proximity to high heat illumination sources.

U.S. Pat. No. 6,216,390 to Peregrin Gonzalez discloses a hydroponic system wherein the nutrient solution temperature is utilized to maintain the air temperature about the plants being grown.

U.S. Pat. No. 5,813,168 to Clendening discloses a greenhouse hydroponic system wherein the nutrient solution temperature is held at approximately 55° F., and utilized to maintain the air temperature about the plants being grown.

U.S. Pat. No. 5,771,634 to Fudger discloses a small home-style computer controlled hydroponic system which automatically maintains various growing parameters such as air temperature, air humidity, illumination cycles, and nutrient solution recirculation.

U.S. Pat. No. 5,501,037 to Aldokimov, et al. discloses an industrial hydroponic system wherein the frequency and duration of nutrient solution release is modified and controlled in accordance with the ambient air temperature.

Taiwan Patent Application No. TW 20080106998 by Chen discloses a hydroponic method which holds plant nutrient solution temperature at 64° F. during winter and 72° F. during summer so plants survive ambient air temperature extremes and reduce the cost of maintaining the ambient air temperature about plant shoots to between 41° F. and 95° F., while preventing plant damage at ambient air temperatures above and below that range.

Chinese Patent No. CN1253715A to Zhaozhang discloses a method of planting young fruit trees out of season by providing heating pipes about the tree root system, trunk, and branches.

Chinese Patent Application No. CN101653089A by Wu discloses a method of protecting crops from low ambient air temperatures by providing irrigation pipes about the plant root system and supplying warm irrigation solution to keep both the root system and by evaporation the plant shoot system warm.

None of these known prior art systems disclose or teach a method of providing a temperature differential between the shoot and root systems of a plant; nor do they state, suggest, imply, or infer a motivation to do so. Moreover, all of these known prior-art systems teach away from providing a temperature differential between the plant shoot and root systems; indicative of the common and yet errant notion that plant shoot temperature and plant root temperature should be approximately the same throughout all growth phases of plant development.

Dutch Patent Application No. NL1020694 by Korsten (hereinafter "Korsten") discloses making use of the principle of an inverted or reverse temperature gradient for saving energy heating a greenhouse environment. By placing the plants as close together as possible, combined with the use of insulating materials placed around the plant containers, a 20-30% energy saving is purported by creating a "microclimate" about each plant (disclosed as a 1 meter space or sphere about the plant).

Korsten also discloses a 7° C. temperature gradient between the greenhouse environment and the growing medium about the plant roots. However, Korsten fails to disclose a distance from the plants from which this gradient extends. Therefore, the 7° C. temperature gradient value disclosed is meaningless. However, if the distance from the plant is presumed to be the disclosed "micro-climate" of 1 meter, then it can be inferred that Korsten discloses a temperature gradient of no greater than 7° C. for every 1 meter distance from the plant root system.

A stated objective of Korsten is to save energy in heating a greenhouse by grouping plants together, providing heat to the growing medium about the roots, and creating a "microclimate" about the plants, and that this "micro-climate" will aid a grower in providing more controllable cultivation during plant flowering or fruiting morphology.

However, Korsten fails to disclose or teach a method of providing a temperature differential between the shoot and root systems of the plant for the purpose of changing plant physiological ontogeny or morphogeny; nor does Korsten state, suggest, imply or infer a motivation to do so. Korsten also does not disclose a plant family or genus, which renders the disclosure moot as to preferred and specific environmental growing conditions.

What is desired therefore is a method of improving the growth of plants of the family Cannabaceae s.s by maintaining a plant shoot temperature which differs from the plant root system temperature based at least in part upon the plant variety, the growth phase of the plant, and the plant organ for desired improvement, by providing a gas mixture temperature about the plant shoot which differs from the growth medium and/or plant growth nutrient solution temperature about the plant root system, whereby the plant shoot temperature may be maintained independently of the plant root system temperature.

What is additionally desired is a method of improving the growth of plants of the family Cannabaceae s.s. by providing a plant nutrient solution temperature below which pathogens such as *Pythium, Fusarium, Verticillium, Rizoctonia* and the like can tolerate, and a temperature above which causes irremediable damage to the plant variety being improved.

SUMMARY OF THE INVENTION

It is therefore an object of the present invention to provide a method of improving the growth of plants belonging to the family Cannabaceae sensu stricto comprising: providing a plant growing apparatus configured for growing a Cannabaceae sensu stricto plant having roots and a shoot, the plant growing apparatus including a plant nutrient solution about the plant roots and a gas mixture circulating about the plant shoot; selecting the gas mixture temperature; selecting the plant nutrient solution temperature independently of the gas mixture temperature; and providing a plant nutrient solution to gas mixture temperature differential of approximately 0° F. or of at least approximately 15° F. during different phases of plant development.

Another objective of the present invention is to provide a method of preventing or treating infection by a pathogen of plants belonging to the genus *C. cannabis* L. comprising: providing a plant growing apparatus configured for growing a *C. cannabis* L. plant having roots and a shoot, the plant growing apparatus including a plant nutrient solution about the plant roots and a gas mixture circulating about the plant shoot; selecting a gas mixture temperature that is in the range of approximately 65 to 85° F.; selecting a plant nutrient solution temperature in the range of approximately 35 to 65° F. based at least in part on the selected gas mixture temperature, whereby the plant nutrient solution temperature is at or below a temperature intolerant to a pathogen belonging to the group consisting of *Pythium, Fusarium, Verticillium,* and *Rizoctonia,* and combinations thereof.

It is further an object of the present invention to provide a method to improve the growth of *C. cannabis* L. plants wherein a gas mixture carbon-dioxide level is increased based at least in part upon the selected plant nutrient temperature and the selected gas mixture temperature.

Still further, an object of the present invention is to provide a method to improve the growth of *C. cannabis* L. plants wherein any change to a selected gas mixture temperature or a selected plant nutrient solution temperature is made in less than approximately 10° F. increments during any one twenty-four hour period.

It is yet another objective of the present invention to provide a method to improve the growth of *C. humulus* L. plants wherein any change to the selected gas mixture or the selected plant nutrient solution temperature is made in less than approximately 20° F. increments during any one twenty-four hour period.

BRIEF DESCRIPTION OF THE DRAWINGS

FIG. 4 is a schematic diagram of another embodiment of the inventive method.

DETAILED DESCRIPTION OF THE INVENTION

Figure 3:
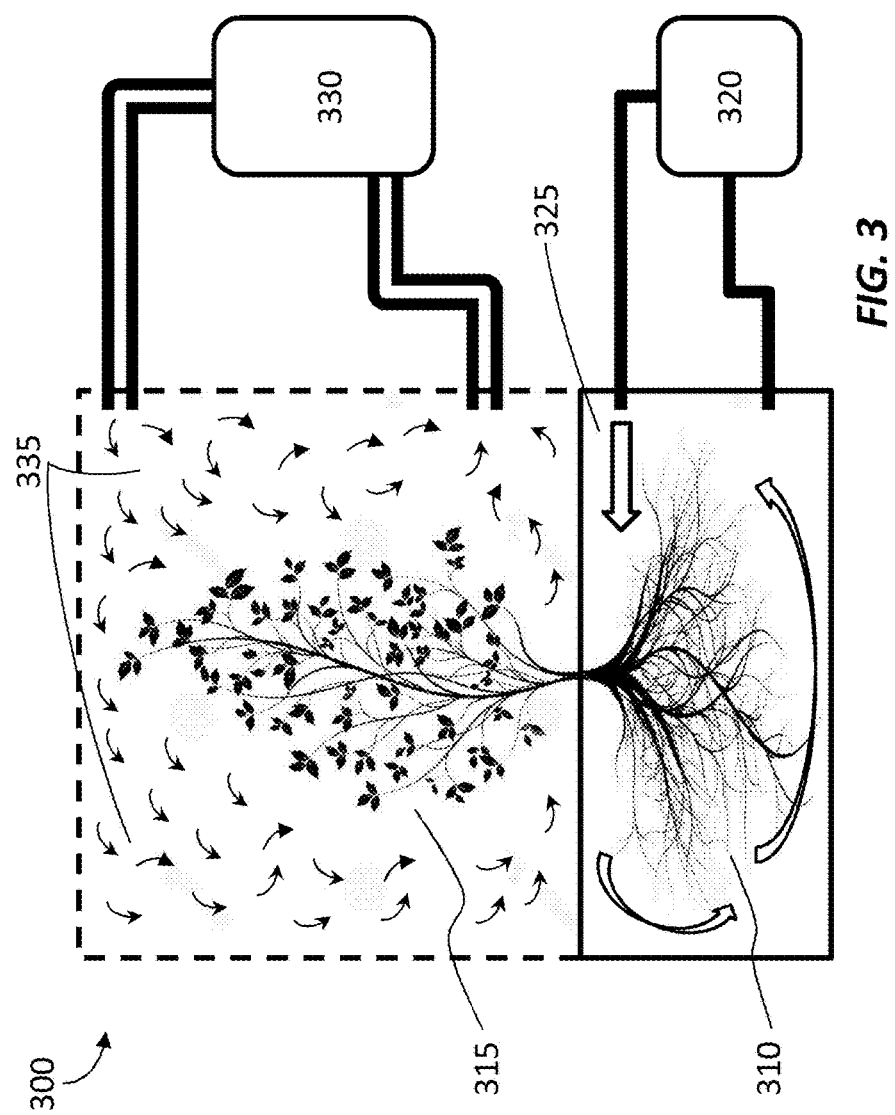
FIG. 3 is a schematic diagram of one embodiment of the inventive method.

As depicted in FIG. 3, the inventive method provides a plant growing apparatus (300) configured for growing a Cannabaceae s.s. plant having roots (310) and a shoot (315). The plant growing apparatus includes a plant nutrient solution (320) about (325) the plant roots (310) and a gas mixture (330) circulating about (335) the plant shoot (315). It is contemplated that the plant growing apparatus (300) is insulated, air-tight, and water-tight to the extent required as to maintain a desired temperature differential between the plant root (310) and plant shoot (315). Many and varied plant growing apparatus types and techniques may be provided; such as hydroponic drip, ebb and flow, nutrient film technique, deep water culture, wick systems, aquaponic system, and the like, and which varieties may be easily adapted to independently select and maintain both plant root (310) and plant shoot (315) temperatures.

Figure 4:
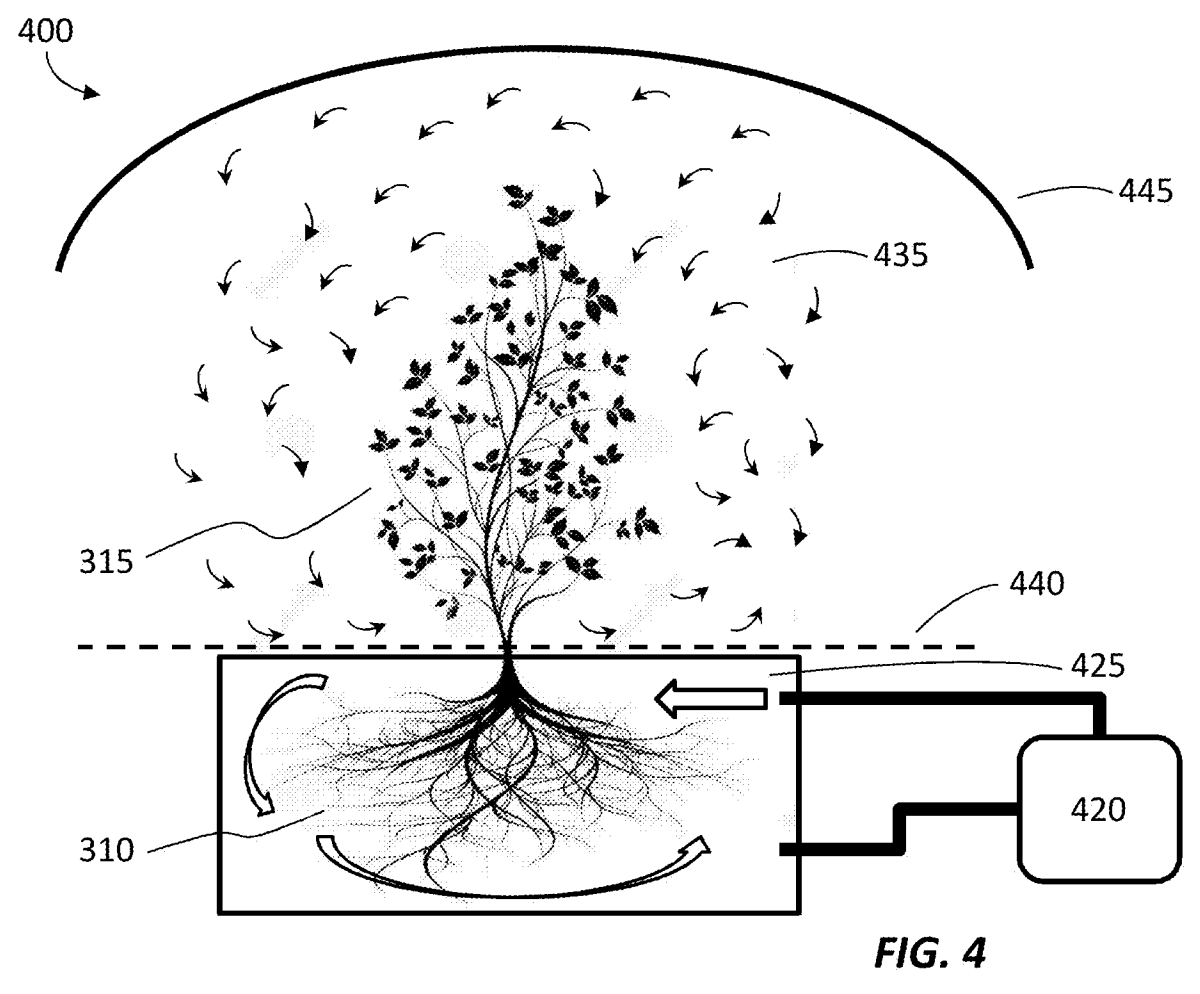

As depicted in FIG. 4, the inventive method provides a plant growing apparatus (400) adapted for outdoor hydroponic or aquaponic cultivation of a Cannabaceae s.s. plant having roots (310) and a shoot (315). The plant growing apparatus (400) includes a plant nutrient solution (420) about (425) the plant roots (310) and allows for air to circulate about (435) the plant shoot (315). It is contemplated that the plant growing apparatus is insulated and water-tight to the extent required as to maintain a desired temperature differential between the plant root (310) and plant shoot (315). Additionally, insulative light reflecting or absorbing material (440) may be placed between the plant shoot and root to facilitate and maintain a desired temperature differential. Still further, insulative or dissipative light reflecting or absorbing material (445) may be suspended over the plant shoot (315) to facilitate and maintain a desired temperature differential. Many and varied plant growing apparatus (400) types and techniques may be provided; such as hydroponic drip, ebb and flow, nutrient film technique, deep water culture, wick systems, aquaponic system, and the like, and may be easily adapted to select and maintain a plant root (310) temperature independently of the circulating air (435) temperature and/or plant shoot (315) temperature.

Figure 5:
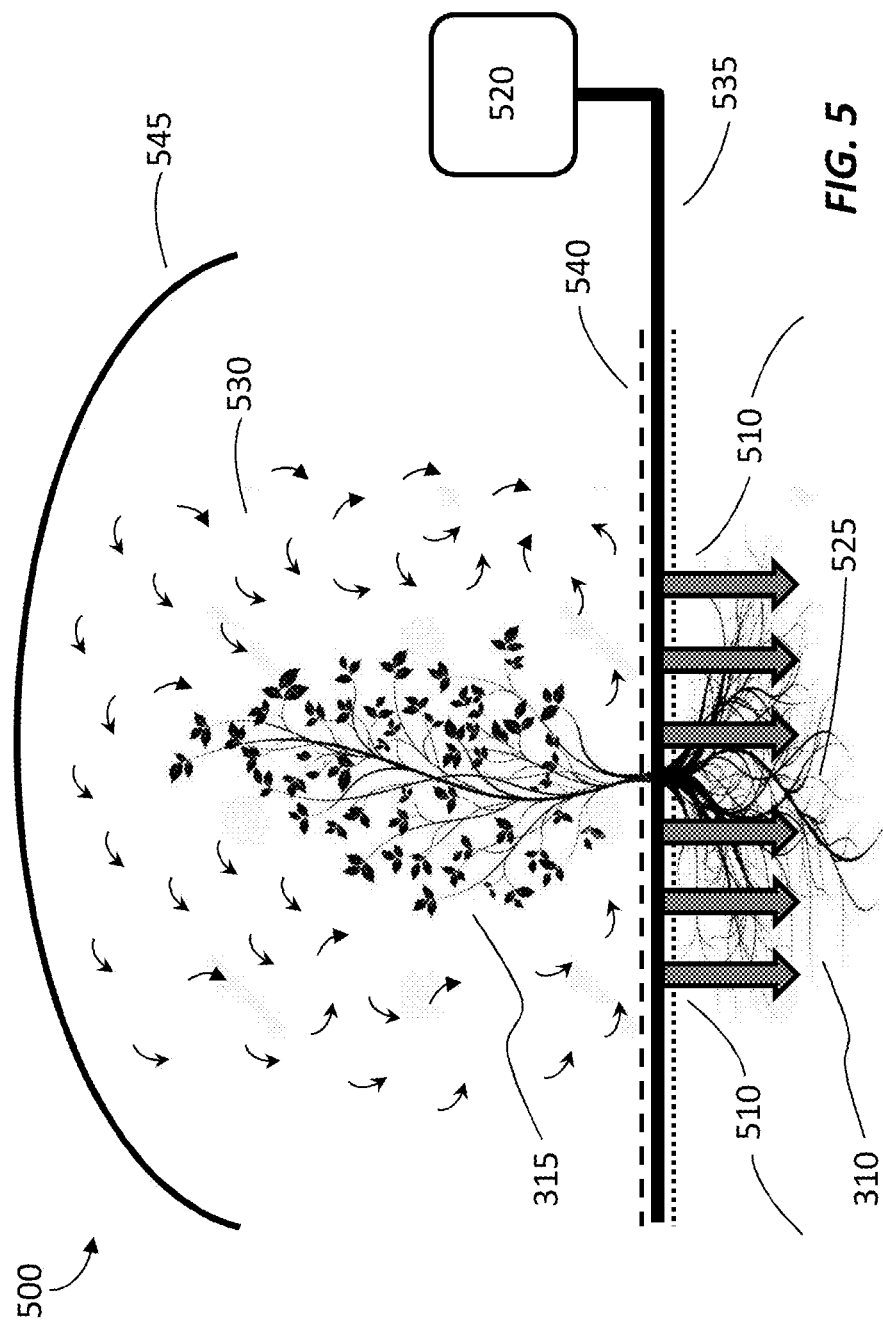
FIG. 5 is a schematic diagram of yet another embodiment of the inventive method.

As depicted in FIG. 5, the inventive method provides a plant growing apparatus (500) adapted to outdoor soil (510) based irrigation farming of a Cannabaceae s.s. plant having roots (310) and a shoot (315). The plant growing apparatus (500) includes an irrigation plant nutrient solution (520) which is conveyed to the plant roots (525) via conventional irrigation means other than "through the air broadcast" or "sprinkler type" techniques. Preferably, drip or troth type irrigation techniques are used as to not alter the shoot (315) temperature of the plant when a temperature differential is desired. Based at least in part on the temperature of the air allowed to circulate about (530) the plant shoot (315), the irrigation plant nutrient solution (520) temperature is selected to provide a desired shoot to root temperature differential. It is contemplated that the plant growing apparatus (500) is insulated and water-tight to the extent required as to maintain a desired temperature differential between the plant root (310) and plant shoot (315). An exemplary plant growing apparatus includes irrigation pipe (535) conveying irrigation nutrient solution (520) through the soil (510) and about (525) the plant roots (310). Additionally, insulative or dissipative light reflecting or absorbing material (540) may be placed between the plant shoot and root to facilitate and maintain a desired temperature differential.

Still further, insulative or dissipative light reflecting or absorbing material (545) may be suspended over the plant shoot (315) to facilitate and maintain a desired temperature differential. Many and varied outdoor soil based plant growing apparatus (500) and techniques may be adapted to select and maintain a plant root (310) temperature independently of the circulating air (530) temperature and/or plant shoot (315) temperature.

By independently selecting a gas mixture temperature and the plant nutrient solution temperature; and by providing a plant nutrient solution temperature to gas mixture temperature differential of approximately 0° F. or of at least approximately 15° F. during different phases of plant development, the growth of plants belonging to the family Cannabaceae s.s. can be improved.

As previously discussed, physiological ontogenic and morphogenic changes caused by shoot to root temperature differentials during plant growth may be exploited to modify a plant's development, and thus improve desired plant organs for industrial, scientific, and medical purposes. However, the developmental changes resulting from differential shoot to root temperatures in part are dependent upon the plant family and species being improved. One plant with a hot shoot and cold roots will react differently from a plant of another plant family, as will one plant variety from another of the same plant family.

In *Growth Responses of Hemp to Differential Soil and Air Temperatures*, by Clarence H. Nelson, *Plant Physiol.* 1944 April; 19(2): 294-309, (hereinafter "Nelson", and hereby incorporated by reference in its entirety) Nelson explains that specific development changes occur in *C. sativa* L. plants grown in such temperature differential environments. Nelson placed *C. sativa* L. into four unchanged temperature conditions (series), remaining unchanged throughout both the vegetative and flora growth phases of the plants. The four temperature conditions Nelson used where:

Shoot at 86° F., and roots at 86° F., (hereinafter "H/H").
Shoot at 86° F., and roots at 60° F., (hereinafter "H/L").
Shoot at 60° F., and roots at 86° F., (hereinafter "L/H").
Shoot at 60° F., and roots at 60° F., (hereinafter "L/L").

The following was observed and concluded by Nelson:

All four temperature series plants developed uniformly for the first four weeks of growth, with significant developmental changes being observed after seven weeks of growth.

The H/H Plants:

Vegetative growth was the most robust, with the smallest internodal length and stem diameter until maturity, and with the greatest root development. Specifically, H/H series plants exhibited the maximum stem elongation; greatest number of nodes produced; earliest blossom and seed formation; least aggregate leaf area; greatest number of leaf abscissions; and the highest absolute water consumption during growth.

The H/L Plants:

Both the aggregate number of leaves produced and the total leaf area per plant where smaller than in any other series. The leaves themselves were relatively thin and more finely veined. This series showed the least anabolic efficiency as noted by their low fresh and dry weight per plant. There was a possibility of impaired translocation of reserves into the region below the ground line due to low root temperatures.

The L/H Plants:

Had the maximum stem diameter and greatest internodal length. Leaves were very coarse in texture, large in size, and extremely thick. Leaf abscission was lowest of the four series, and leaf and stem production was favored. Plants of this series had the largest stem diameter, largest individual leaves, and highest aggregate dry weight.

The L/L Plants:

The leaves on these plants were relatively large, attaining the maximum area per leaf of the four series. Though the stems attained a height only slightly greater than in the L/H plants, the stem diameter was relatively large. The vegetative habit was essentially similar to L/H plants except as to stem length.

It has surprisingly been found during instant inventor experimentation that applying similar shoot to root temperature differentials to Cannabaceae s.s. plants also improves the quality of various plant organs and overall plant growth. While not wishing to be bound by any one theory or combination of theories, it is believed that, the timing, sequence, and range of shoot-to-root temperature differentials selected during development of Cannabaceae s.s. plants, during selected phases of plant growth, improves the growth of various organs and characteristics of Cannabaceae s.s. plants and improves such plants for industrial, scientific, and medical uses.

It was observed during instant inventor experimentation that *C. cannabis* L. plants placed in a shoot to root temperature differential condition exhibit physiological ontogenic changes if the temperature differential is approximately 10° F. or greater. Below this approximate 10° F. temperature differential threshold, *C. cannabis* L plants exhibit no or little significant physiological ontogenic change, even after long term temperature differential exposure. Hereinafter, this approximate 10° F. or greater temperature differential will be symbolized either as a ">10° F.+/−" or as a ">10° F.−/+" temperature condition when the plant being improved belongs to the *C. cannabis* L. family; the first position representing selected shoot temperature, and the second position representing selected root temperature, and the "+" and "−" indicative of whether the shoot or root temperature is above or below the other.

Based upon instant inventor experimentation, *C. humulus* L. plants placed in a shoot to root temperature differential condition, exhibit physiological ontogenic changes if the temperature differential is approximately 20° F. or greater. Below this approximate 20° F. temperature differential threshold, *C. humulus* L. plants exhibit no or little significant physiological ontogenic change, even after long term temperature differential exposure. Hereinafter, this approximate 20° F. or greater temperature differential will be symbolized either as a ">20° F.+/−" or as a ">20° F.−/+" temperature condition when the plant being improved belongs to the *C. humulus* L. family; the first position representing selected shoot temperature, and the second position representing selected root temperature, and the "+" and "−" indicative of whether the shoot or root temperature is above or below the other.

Hereinafter, for both *C. cannabis* L. and *C. humulus* L. family plants, an approximate 0° F. shoot to root temperature differential will be symbolized as a "0° F. S/R" temperature condition.

Figure 1:
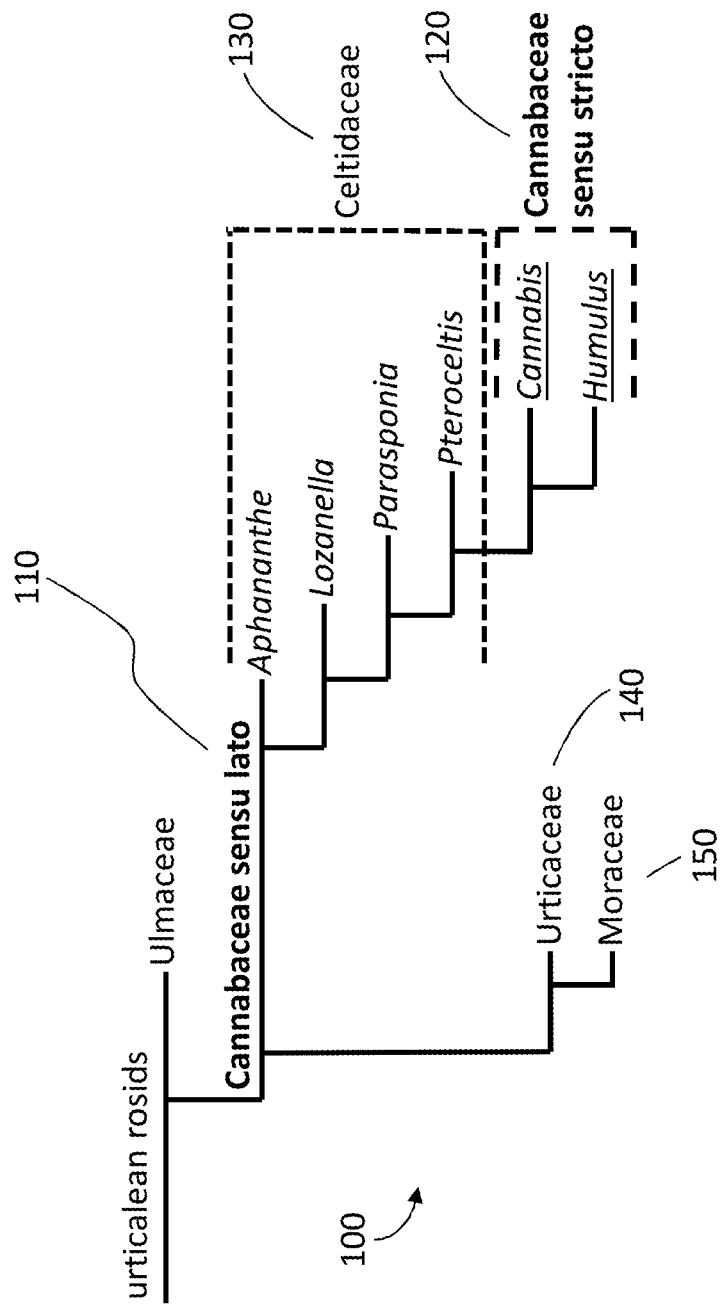
FIG. 1 is a phylogenetic diagram of the Cannabaceae s.l. plant family.
Figure 2B:
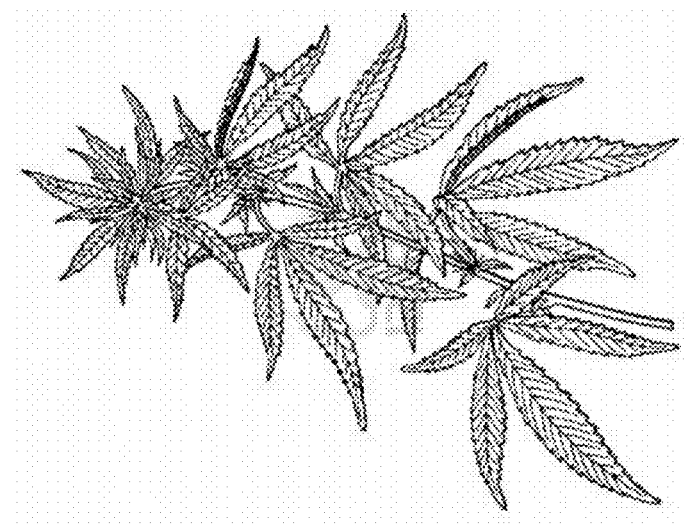
FIG. 2B is a horticultural drawing of a *C. cannabis* L. plant; depicting plant, stems, braches, and leaves.
Figure 2A:
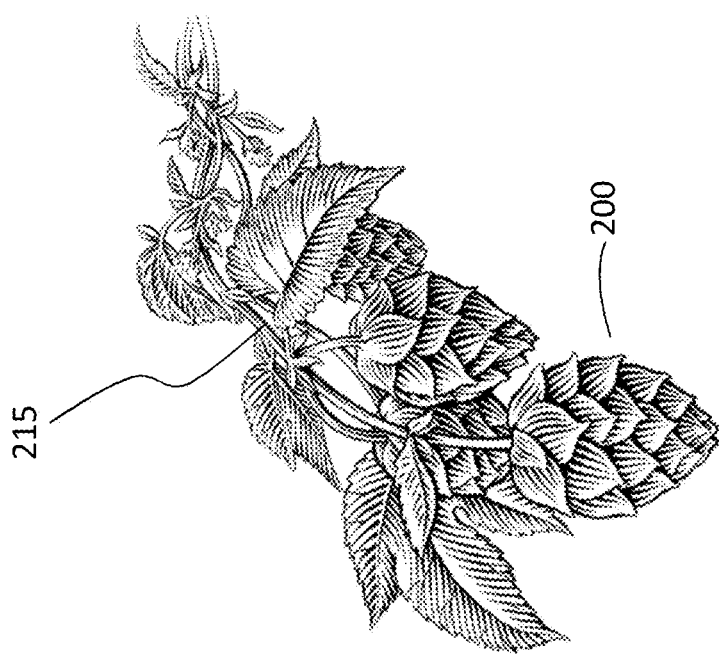
FIG. 2A is a horticultural drawing of a *C. humulus* L. plant; depicting plant, leaves, vines, and mature cones (flowers).

*C. humulus* L. plants, FIG. 2, have been cultivated for millennia, especially *H. lupulus* L. or "common" hops. Hops is a herbaceous hardy perennial vine, with a permanent rootstock which can grow over 12 feet deep into the soil, and which can live for 25 to 50 years.

In relation to the present invention, hops cultivation presents district periods where properly timed shoot to root temperature differentials may be provided to manipulate and improve the development of the plants, whereby at least one organ of the plant is improved for industrial, scientific, or medical use.

There are two main points of opportunity in hops cultivation, the vegetative growth phase where bines are being pruned and trained onto trellises, and the flora growth phase where cones and rhizomes are being produced.

Figure 6:
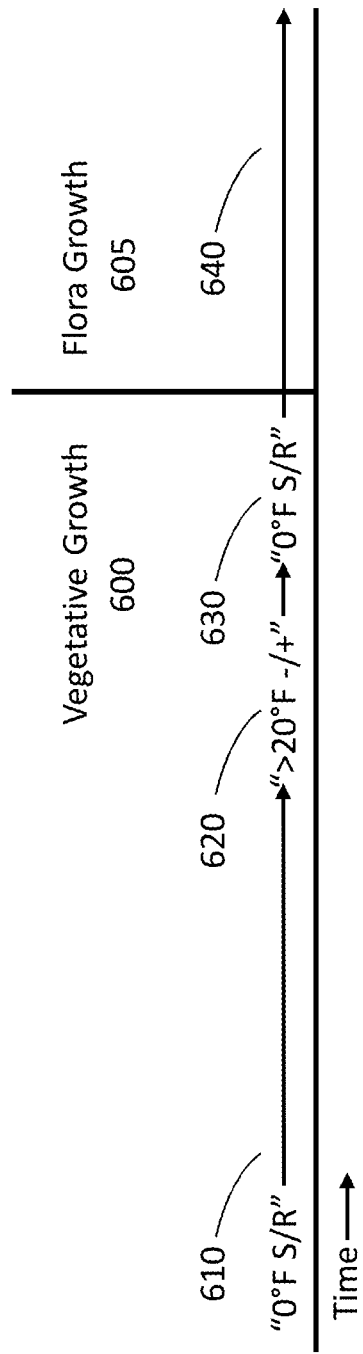
FIG. 6 is a schematic diagram of a *C. humulus* L. plant's development indicating various stages of shoot to root temperature differential provided to improve selected plant organs.

As depicted in FIG. 6, one embodiment of the present invention, provides selected shoot to root temperature differentials during C. humulus L. vegetative growth (600) and flora growth (605) phases, wherein at least one organ of the plant may be improved for industrial, scientific, or medical use. The primary organ of use produced by hops is the flower (FIG. 2, 200), called a "cone". Therefore an objective of the present embodiment of the inventive method is to improve the quality and production output of hop cones (200).

During hops vegetative growth, it is desired to establish and maintain a hardy and robust root system (310), while increasing hop bine (210) growth rate and bine diameter. It is also desirable to produce the most nodes with the smallest internodal length. All of these characteristics are developmentally emphasized (except bine/stem diameter) by providing a 0° F. S/R temperature condition (610) for the plant.

Once the vegetative growth begins to slow in anticipation of the flora growth phase, it is desirable to increase the bine (215) diameter in order to provide more nutrient delivery to the plant reproductive organs once the flora growth phase has robustly begun. Additionally, it is desirable for the root system to continue vigorous development either for rhizome production for transplant, or alternately for increasing cone production by trimming rhizomes just as they appear from the main roots stock. This known cultivation technique aids in "rerouting" plant resources into cone production. All of these characteristics are developmentally aided or improved by providing a >20° F.–/+ temperature condition (620) for the plant during a transitional growth phase as vegetative growth slows in anticipation of flora growth (605).

Once vegetative growth significantly slows prior to the beginning of the flora phase, it is desirable to provide increased nutrient delivery to the plant reproductive organs once the flora growth phase has begun. This characteristic is developmentally improved by providing (reestablishing) a 0° F. S/R temperature condition (630) for the plant, and maintaining a 0° F. S/R temperature condition (640) throughout the plant flora growth phase (605).

By providing a >20° F.–/+ temperature condition before the end of the vegetative and a 0° F. S/R temperature condition during the flora growth phases of C. humulus L. genus plants, the plant reproductive organs (200) may be improved for industrial, scientific, and medical use.

Hops, being a large plant, does not lend itself to indoor growing, unless horizontal trellising, or similar technique is practiced. In such circumstances, providing a >20° F.–/+ temperature condition is relatively easy using a plant growing apparatus similar to as described in FIG. 3. Additionally, a greenhouse type structure may be erected over open ground to utilize and protect primary root stocks over their 25-50 year life span.

Providing a >20°–/+ temperature condition during outdoor hops growing is also relatively easy using a plant growing apparatus similar to as described in FIG. 5. Providing insulative light absorbing material (540) between the plant shoot (315) and the plant roots (310) and increasing the irrigation nutrient solution (520) temperature, will provide an effective >20° F.–/+ temperature condition. Reestablishing a 0° F. S/R temperature condition prior to entering the hops flora growth phase (630) is accomplished by increasing the irrigation nutrient solution (520) temperature and/or removing the insulative light absorbing material (540).

Conversely and advantageously, since C. cannabis L. varieties are relatively small in size and are annuals; they do lend themselves to modern hydroponic, aeroponic, and/or aquaponic growing methods. Therefore, providing effective shoot to root temperature differentials for a C. cannabis L. variety is extremely easy using a plant growing apparatus similar to as described in FIG. 3.

C. cannabis L. varieties, FIG. 2B, are relatively easy to grow, and can survive temperatures from 0-100° F., and almost all growing well under "typical houseplant" conditions. However, most C. cannabis L. varieties have photoperiod induced flowering. That is, most C. cannabis L. varieties are induced to flower when the light cycle is less than approximately 14 hours per every 24 hours. In other words, most C. cannabis L. varieties will remain in the vegetative growth phase indefinitely provided a photoperiod above approximately 14-16 hours per day. Therefore, the timing of flora growth phase initiation may be controlled via photoperiod variation.

C. cannabis L. cultivation is rather simplistic relative to that of C. humulus L. Providing adequate light at a desired photoperiod, circulating air at approximately 75° F. at a relative humidity of approximately 50%, and providing an adequate growing medium with sufficient water, nutrients, and pH is basically all that is required. C. cannabis L. plants have been colloquially called "weeds", and they typically grow like such.

In an embodiment of the present invention, providing selected shoot to root temperature differentials during C. cannabis L. seedling, vegetative, and flora growth phases, at least one organ of the plant may be improved for industrial, scientific, or medical use.

Nelson's observations and instant inventor experimental data indicate that plants exposed to all four differential temperature condition types exhibited little or no developmental differences during the first 4 weeks of growth, and providing an 0° F. S/R temperature condition during seedling growth phase results in improved growth and development of the plant for all intended uses.

In an embodiment of the present invention, the primary organ for desired improvement is C. cannabis L. plant stems.

Desired plant characteristics for stem improvement are: robust vegetative growth, stem elongation, a wide stem diameter, the least number of nodes, long internode length, and maximum plant material weight and density.

Figure 7:
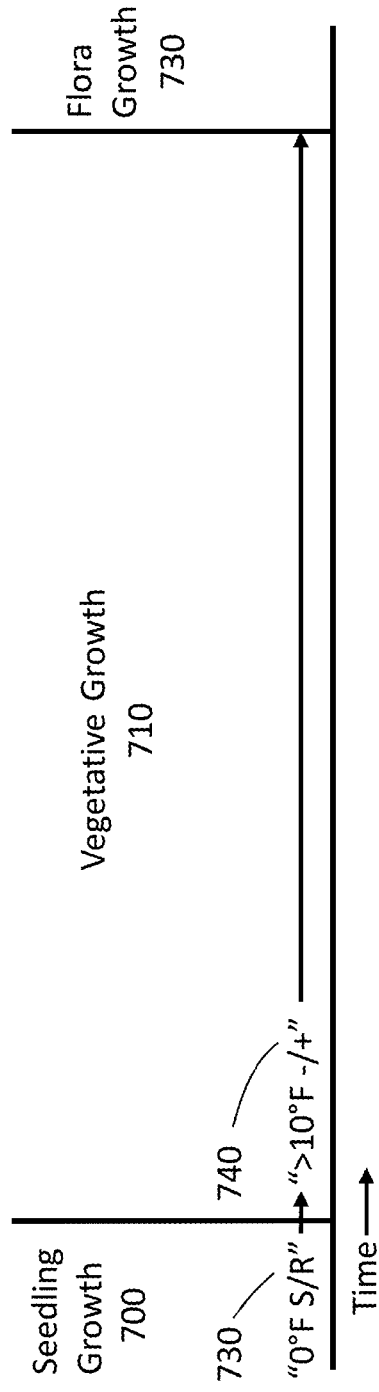
FIG. 7 is a schematic diagram of a *C. cannabis* L. plant's development indicating various stages of shoot to root temperature differential provided to improve selected plant organs.

As depicted in FIG. 7, after providing a seedling a 0° F. S/R temperature condition (730), and providing during vegetative growth a >10° F.–/+ temperature condition (740), improved plant stem growth, weight, and density can be observed.

For stem production, the plant is harvested before, or never induced into, the plant flora growth (730) phase.

During instant inventor experimentation, two groups of four genetically identical C. indica L. seedlings (cuttings) were placed in identical growing environments with both group's root temperature being maintained at 75° F. The first group's shoots were maintained at 75° F. (a 0° F. S/R temperature condition), while the second group's shoots were transitioned to and maintained at 45° F. (a ">10° F.–/+" temperature condition) during plant vegetative growth.

As was similarly observed by Nelson, after 60 days of vegetative growth, the >10° F.−/+ group had main stems approximately 30-40% taller and 200-230% thicker than the 0° F. S/R group. Also observed was high internodal length, and extremely thick and tough leaves as compared to the 0° F. S/R group. The final dry weight of the >10° F.−/+ group was almost double that of the 0° F. S/R group. Also observed was an increase in stem wall thickness of 350-400%. After plant drying, the >10° F.−/+ group main stems were similar to very thick walled bamboo.

In another embodiment of the present invention, the target for desired improvement is *C. cannabis* L. plant reproductive organs.

Desired plant characteristics for reproductive organ improvement are: robust vegetative growth, moderate stem diameter, the greatest number of nodes, short internode length, and improved reproductive organ number, density, size, and weight.

Figure 8:
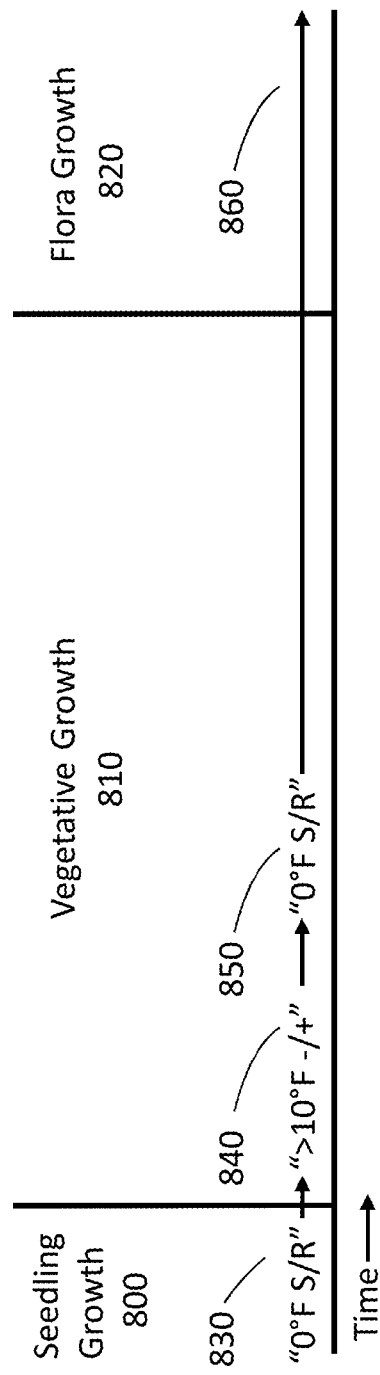
FIG. 8 is a schematic diagram of a *C. cannabis* L. plant's development indicating various stages of shoot to root temperature differential provided to improve selected plant organs.

Referring to FIG. 8, after providing a seedling a 0° F. S/R temperature condition (830), and then providing during a first portion of vegetative growth an >10° F.−/+ temperature condition (840) results in a thickening of the stem wall and an increase in stem diameter. Vigorous root growth also continues under >10° F.−/+ temperature conditions.

This shoot to root temperature differential sequence slightly-to-moderately thickens stems and branches during an early portion of vegetative growth, then returning the plant to a 0° F. S/R temperature condition (850) results in continued robust vegetative growth, a moderate stem diameter, a large number of nodes, and short internodal length; all desirable characteristics in preparation for entering the plant flora growth (820) phase.

Plant growth is finished while maintaining a 0° F. S/R temperature condition (860) during the plant flora growth (820) phase, which improves reproductive organ, density, size, and weight.

During instant inventor experimentation, two groups of four genetically identical *C. indica* L. seedlings (cuttings) were placed in identical growing environments with both group's root temperature being maintained at 75° F. The first group's shoots were maintained at 75° F. (a "0° F. S/R" temperature condition), while the second group's shoots were transitioned to and maintained at 55° F. (a ">10° F.−/+" temperature condition) during the first third of plant vegetative growth.

As was similarly observed by Nelson, after 30 days of vegetative growth, the >10° F.−/+ group had main stems approximately 15-20% taller and 100-150% thicker than the 0° F. S/R group. Also observed was higher internodal length, and moderately thick and tough leaves as compared to the 0° F. S/R group.

After 15 days of further vegetative growth under >10° F.−/+ temperature conditions, the second group's shoots were transitioned and maintained at 75° F. (a "0° F. S/R" temperature condition) for the remainder of the plant vegetative phase, and the entirety of the flora growth phase.

After another 45 days of vegetative growth, the plants were induced into the flora growth phase via photoperiod variation. The 0° F. S/R temperature condition was maintained during an additional 30 days of flora growth.

At plant harvest, the second group (>10° F.−/+ for first one-third of vegetative growth) main stems were approximately 25-30% taller and 80-100% thicker than the first group (0° F. S/R only). However, the overall internodal number was greater and the internodal distance was less in the second group than in the first, which resulted in a greater number and increased weight and density of reproductive organs. The final dry weight of reproductive organs from the second group was 100-180% greater than the first group.

Figure 9:
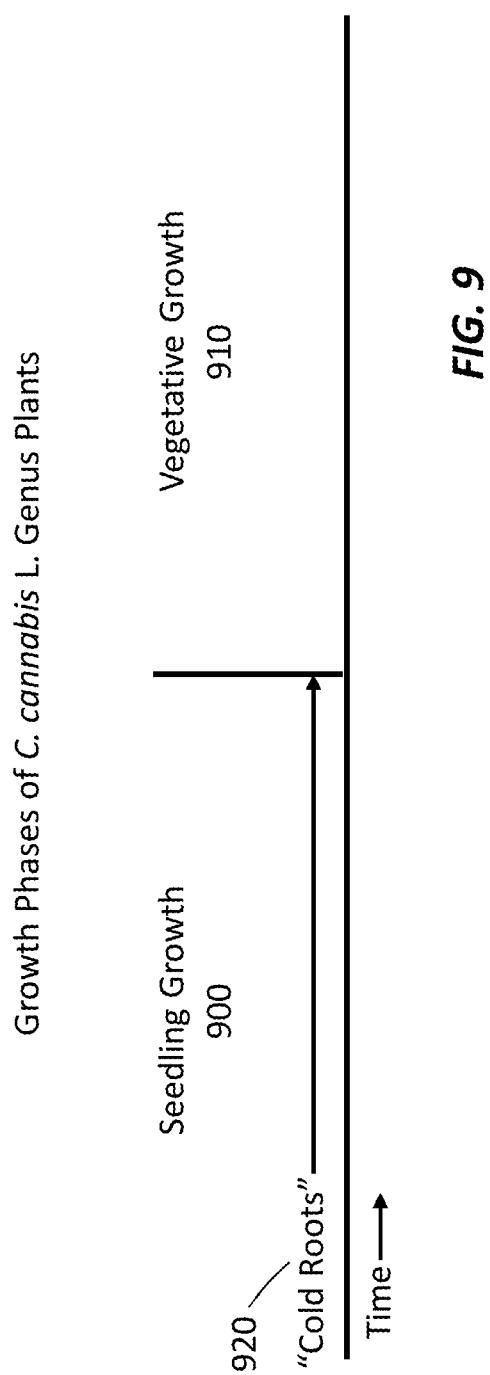
FIG. 9 is a schematic diagram of a *C. cannabis* L. plant's development indicative of a period of low root temperature provided to prevent or treat infection by a plant pathogen.

As depicted in FIG. 9, in another embodiment of the present inventive method, a *C. cannabis* L. variety root temperature is reduced wherein the plant nutrient solution temperature is harmful to plant pathogens wherein the pathogens become intolerant of the temperature. Plants in the seedling growth phase may be placed in this "cold roots" temperature condition (920) in order to prevent or eradicate infection by a pathogen, while maintaining both vigorous shoot and root growth. It should be noted that during the seedling growth phase, little if any significant developmental changes were observed by Nelson nor the instant inventor; therefore the primary objective in reducing root temperature during seedling growth is the prevention or treatment of a harmful plant pathogen.

Figure 10:
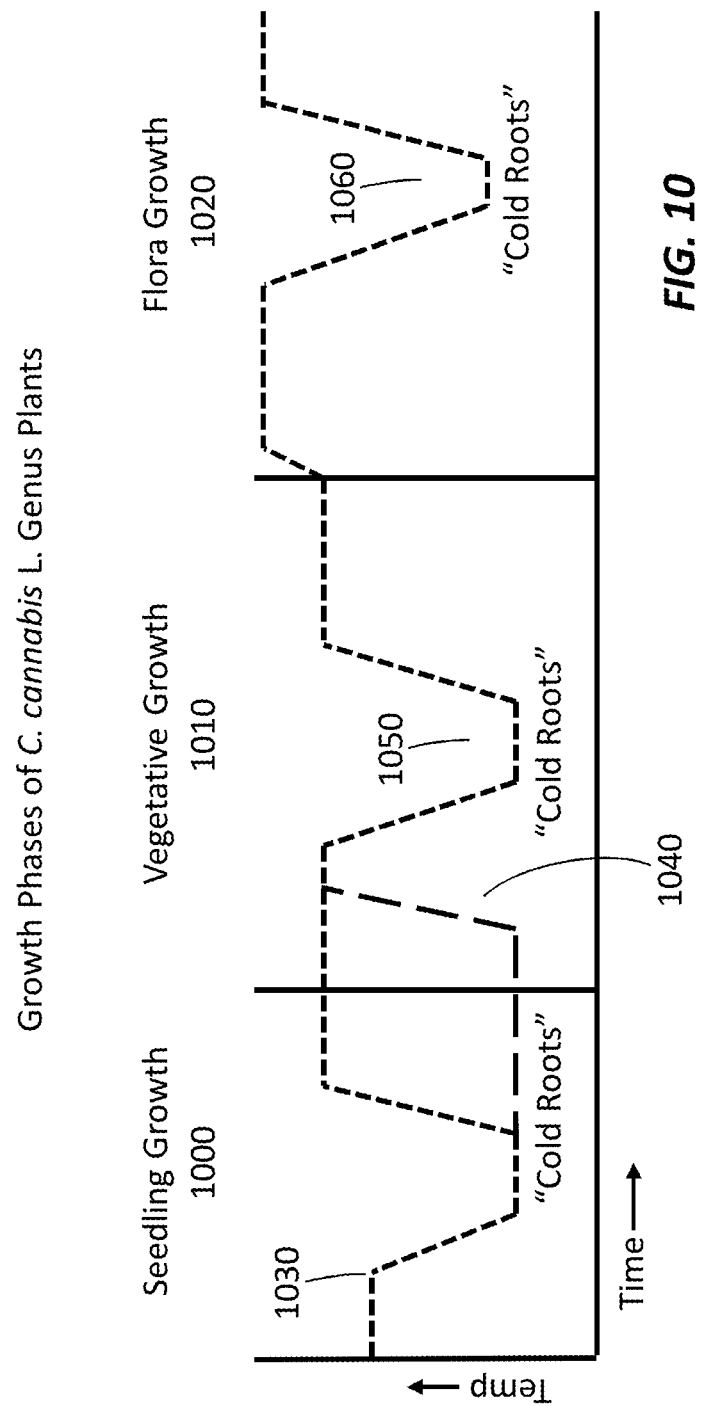
FIG. 10 is a schematic diagram of a *C. cannabis* L. plant's development indicative of periods of low root temperature provided to prevent or treat infection by a plant pathogen.

As depicted in FIG. 10, in another embodiment of the present inventive method, as observed by the instant inventor, temporarily reducing plant nutrient solution temperature (1030) for the purpose of eradicating or preventing infection by a harmful pathogen has no or little physiological ontogenic or morphogenic affect if the period of "cold roots" is approximately less than 5 days in duration. This therapeutic period of "cold roots" may be accomplished during either plant seedling growth (1000) vegetative growth (1010) or flora growth (1020) phases. As depicted by temperature line 1040, preferably if a plant is placed in a therapeutic "cold roots" condition during seedling growth, in order to prevent pathogen re-infection, the plant may remain in that "cold roots" condition until morphogenic changes for a particular growing sequence requires an increase in plant root temperature. As observed during instant inventor experimentation, several periods of therapeutic "cold roots" of 3-5 days duration (1050,1060) were executed randomly throughout both plant vegetative and flora growth phases without noticeable morphogenic difference, as compared to plants which were not placed in a therapeutic "cold root" condition.

When changes are made in plant environmental temperature, preferably the change should be made gradually rather than abruptly; as to avoid overly stressing the plant. Such stress causes growth retardation and stunts the plant overall. Preferably, selected gas mixture temperature and/or plant nutrient solution temperature changes should be less than approximately 10° F. in any one twenty-four hour period, for *C. cannabis* L. plants; and less than approximately 20° F. in any one twenty-four period, for *C. humulus* L. plants. In this way, plant stress caused by selected temperature change may be minimized.

Another known public domain aspect of Cannabaceae s.s. plant cultivation is gas mixture carbon-dioxide augmentation. Introducing supplemental carbon-dioxide into ambient air about a plant shoot is known to increase crop yield up to approximately 30%. This increase is caused by improved plant transpiration and thus improved photosynthesis and carbohydrate transfer. A further aspect of this known method is that due to improved plant transpiration, the plant can withstand higher shoot temperatures, and correspondingly higher levels of luminance intensity. Higher levels of luminance intensity results in improved photosynthesis, and typically an additional 20-30% improvement in crop yield.

It was observed during instant inventor experimentation that Cannabaceae s.s. plant developmental changes caused by shoot to root temperature differentials tended to increase in rate of change and in degree or extent of change as shoot to root temperature differentials were increased.

Utilizing carbon-dioxide augmentation during plant development allows for increased gas mixture temperatures, and therefore increased shoot to root temperature differentials. The increased shoot to root temperature differentials allowed utilizing carbon-dioxide augmentation results in improved plant morphogenic changes, improved plant growth overall, and thus reduces cultivation cost and time while increasing crop yields.

It should be understood that FIGS. 3-10 are only illustrative of various aspects of the present inventive method, and are not intended to be accurate or to scale as to time, temperature, or physical dimensions related to the described inventive shoot to root temperature sequence.

Having thus described several embodiments for practicing the inventive method, its advantages and objectives can be understood. Variations from the drawings and description can be made by one skilled in the art without departing from the scope of the invention, which is to be determined from the following claims.

Although the inventive method has been described with reference to a particular sequence of shoot to root temperature differentials and/or temperature values, and the like, these are not intended to exhaust all possible sequences or temperatures, and indeed many other modifications and variations will be ascertainable to those of skill in the art.

Although the inventive method has been described with reference to a particular plant family, other plant families and genera may also be improved by practicing the inventive method, without departing from the objectives and scope of the instant invention.

Accordingly, this invention is not to be limited by the embodiments as shown in the drawings and/or as described in the description, since these are given by way of example only and not by way of limitation.

What I claim is:

1. A method of improving the growth of plants belonging to the family Cannabaceae sensu stricto, the method comprising:
   providing at least one plant belonging to the family Cannabaceae sensu stricto having plant roots and a plant shoot;
   providing a plant growing apparatus configured for growing the at least one Cannabaceae sensu stricto plant, the plant growing apparatus including a plant nutrient solution about the plant roots and a gas mixture circulating about the plant shoot;
   selecting a plant nutrient solution temperature to produce a root temperature for the at least one plant;
   selecting a gas mixture temperature to produce a shoot temperature for the at least one plant; and
   controlling a temperature differential between the root temperature and the shoot temperature during different phases of plant development,
   wherein the temperature differential is at least approximately 15° F. during one portion of vegetative growth phase of the at least one plant lasting at least 30 days and being continuous throughout the at least 30 days of the vegetative growth phase; and wherein the temperature differential is approximately 0° F. during another portion of the vegetative growth phase of the plant, such that the change in the temperature differential improves growth of the at least one plant." was changed to providing and maintaining a temperature differential of at least approximately 10° F. during a portion of vegetative growth phase of the at least one plant lasting at least 30 days and being continuous throughout the at least 30 days of the vegetative growth phase; wherein the gas mixture temperature is below the plant nutrient solution temperature; transitioning to and maintaining a temperature differential of approximately 0° F. during a remaining portion of the vegetative growth phase of the at least one plant, such that the change in temperature differential improves growth of the at least one plant; wherein the remaining portion is approximately 45 days.

2. The method of claim 1 wherein the phases of plant development comprise seedling growth, vegetative growth, and flora growth.

3. The method of claim 2 wherein based at least in part on the plant variety, at least in part on the plant nutrient solution N-P-K concentration level, and at least in part on the plant growth phase, the selected plant nutrient solution temperature is lowered to prevent or eradicate infection by a plant pathogen, the plant pathogen being from the group consisting of *Pythium, Fusarium, Verticillium*, and *Rizoctonia*, and combinations thereof.

4. The method of claim 3 wherein the selected plant nutrient solution temperature is above a level which causes the plant of a selected variety to be irremediably harmed.

5. The method of claim 2, wherein the plant belongs to the genus *C. cannabis* L.

6. The method of claim 5, wherein at least one of plant stem development, plant leaf development and plant root development is improved due to the temperature differential between the plant root temperature and the plant shoot temperature.

7. The method of claim 5 wherein any change to the selected gas mixture temperature or the selected plant nutrient solution temperature is made in less than approximately 10° F. increments during any one twenty-four hour period.

8. The method of claim 2 wherein the plant belongs to the genus *C. cannabis* L., wherein the temperature differential is at approximately 0° F. during the seedling growth phase of the plant.

9. The method of claim 8 wherein any change to the selected gas mixture temperature or the selected plant nutrient solution temperature is made in less than approximately 10° F. increments during any one twenty-four hour period.

10. The method of claim 2 wherein the plant belongs to the genus *C. cannabis* L., wherein the temperature differential is approximately 0° F. during the flora growth phase.

11. The method of claim 10 wherein plant reproductive organ development is improved.

12. The method of claim 10 wherein any change to the selected gas mixture temperature or the selected plant nutrient solution temperature is made in less than approximately 10° F. increments during any one twenty-four hour period.

13. The method of claim 1 wherein the gas mixture comprises air, and the method further comprises the step of increasing the carbon-dioxide level of the air based at least in part upon the selected plant nutrient temperature and at least in part on the selected air temperature.

14. The method of claim 1, further comprising maintaining the plant shoot temperature independently of the plant root temperature.

15. The method of claim 1, wherein the plant belongs to the species *C. indica* L.

16. The method of claim 1, wherein the plant nutrient solution temperature is between 65-70° F.

17. The method of claim 1, wherein the plant nutrient solution temperature is less than 80° F.

* * * * *

UNITED STATES PATENT AND TRADEMARK OFFICE
CERTIFICATE OF CORRECTION

PATENT NO.        : 9,622,426 B2
APPLICATION NO.   : 14/046050
DATED             : April 18, 2017
INVENTOR(S)       : Ankner Page 1 of 1

It is certified that error appears in the above-identified patent and that said Letters Patent is hereby corrected as shown below:

In the Claims

Column 15, Line 34-Column 16, Line 8 (approx.), Please correct Claim 1 to read:
1. A method of improving the growth of plants belonging to the family Cannabaceae sensu stricto, the method comprising:
 providing at least one plant belonging to the family Cannabaceae sensu stricto having plant roots and a plant shoot;
 providing a plant growing apparatus configured for growing the at least one Cannabaceae sensu stricto plant, the plant growing apparatus including a plant nutrient solution about the plant roots and a gas mixture circulating about the plant shoot;
 selecting a plant nutrient solution temperature to produce a root temperature for the at least one plant;
selecting a gas mixture temperature to produce a shoot temperature for the at least one plant; and
 controlling a temperature differential between the root temperature and the shoot temperature during different phases of plant development,
 providing and maintaining a temperature differential of at least approximately 10° F. during a portion of vegetative growth phase of the at least one plant lasting at least 30 days and being continuous throughout the at least 30 days of the vegetative growth phase; wherein the gas mixture temperature is below the plant nutrient solution temperature;
 transitioning to and maintaining a temperature differential of approximately 0° F. during a remaining portion of the vegetative growth phase of the at least one plant, such that the change in temperature differential improves growth of the at least one plant; wherein the remaining portion is approximately 45 days.

Signed and Sealed this
First Day of December, 2020

Andrei Iancu
*Director of the United States Patent and Trademark Office*